(12) United States Patent
Duveblad et al.

(10) Patent No.: US 10,908,910 B2
(45) Date of Patent: Feb. 2, 2021

(54) LAZY COPYING OF RUNTIME-MANAGED STACK FRAMES

(71) Applicant: Oracle International Corporation, Redwood Shores, CA (US)

(72) Inventors: Erik Duveblad, Taby (SE); Ron Pressler, London (GB)

(73) Assignee: Oracle International Corporation, Redwood Shores (CA)

( * ) Notice: Subject to any disclaimer, the term of this patent is extended or adjusted under 35 U.S.C. 154(b) by 208 days.

(21) Appl. No.: 16/241,608

(22) Filed: Jan. 7, 2019

(65) Prior Publication Data

US 2020/0034150 A1 Jan. 30, 2020

Related U.S. Application Data

(60) Provisional application No. 62/703,992, filed on Jul. 27, 2018.

(51) Int. Cl.
  *G06F 9/34* (2018.01)
  *G06F 9/445* (2018.01)
  *G06F 9/52* (2006.01)
  *G06F 9/46* (2006.01)

(52) U.S. Cl.
  CPC .......... *G06F 9/34* (2013.01); *G06F 9/44589* (2013.01); *G06F 9/461* (2013.01); *G06F 9/522* (2013.01)

(58) Field of Classification Search
  None
  See application file for complete search history.

(56) References Cited

U.S. PATENT DOCUMENTS

| 6,766,513 | B2 * | 7/2004 | Charnell | G06F 8/4442 717/154 |
|---|---|---|---|---|
| 6,769,004 | B2 | 7/2004 | Barrett | |
| 8,051,426 | B2 * | 11/2011 | Meijer | G06F 9/45504 718/108 |
| 8,825,719 | B2 | 9/2014 | Steensgaard et al. | |
| 2005/0267996 | A1 * | 12/2005 | O'Connor | G06F 9/264 710/1 |

OTHER PUBLICATIONS

Yuasa et al., "Return Barrier", International Lisp Conference, 2002, pp. 1-12 (Year: 2002).*

* cited by examiner

*Primary Examiner* — Eric C Wai
(74) *Attorney, Agent, or Firm* — Invoke

(57) ABSTRACT

Techniques for lazy copying of runtime-managed stack frames are disclosed. A runtime environment generates a runtime-managed stack including multiple frames. A topmost subset of frames includes data associated with particular instructions and a return address. A lower subset of frames includes data associated with different instructions. The runtime environment stores a copy of the topmost subset of frames in an OS-managed stack, without copying the lower subset. The particular instructions execute using the copy of the topmost subset of frames in the OS-managed stack. The runtime environment replaces, in the copy, the return address with a return barrier address. When execution of the instructions terminates, control passes to return barrier instructions, which store a copy of the lower subset of frames in the OS-managed stack and pass control to the different instructions. The different instructions execute using the copy of the lower subset of frames in the OS-managed stack.

20 Claims, 10 Drawing Sheets

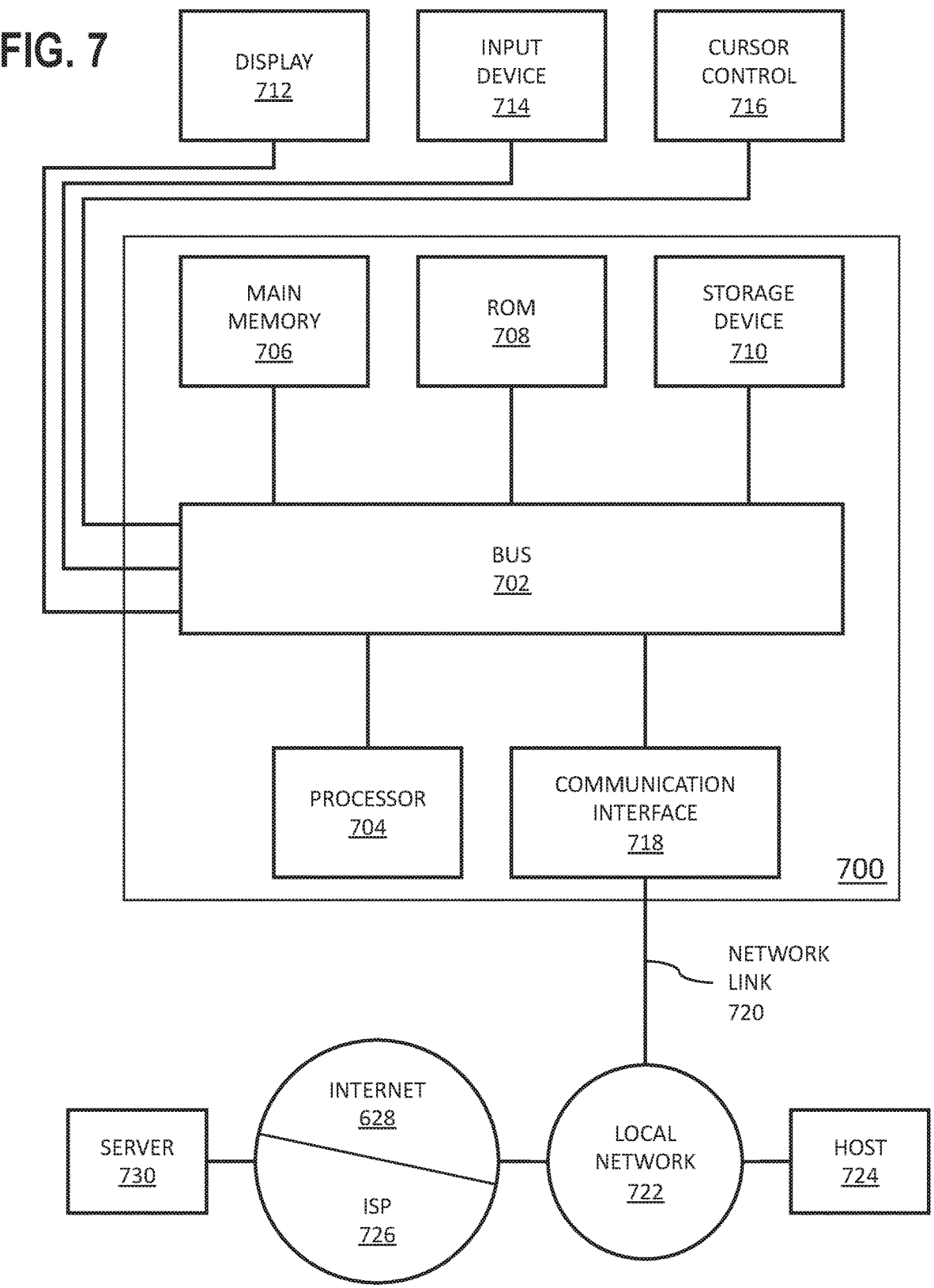

US 10,908,910 B2

LAZY COPYING OF RUNTIME-MANAGED STACK FRAMES

BENEFIT CLAIMS; RELATED APPLICATIONS; INCORPORATION BY REFERENCE

This application claims the benefit of U.S. Provisional Patent Application 62/703,992, filed Jul. 27, 2018, which is hereby incorporated by reference.

The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to runtime environments. In particular, the present disclosure relates to stack management.

BACKGROUND

A stack is a last-in, first-out (LIFO) data structure. The operation of adding data to a stack is called a push operation. The operation of removing data from a stack is called a pop operation. Computer systems use stacks, sometimes referred to as call stacks, to manage data associated with executable code. A computer system may manage multiple call stacks. For example, a multi-threaded computer system may manage one or more different call stacks for each thread.

In a call stack, data is organized into units called frames. Each frame is associated with a particular set of code, such as a method. Each frame stores data for that particular set of code, such as local variable values and/or return values. In some cases, a frame stores a return address corresponding to the memory location of the next instruction to be executed when the current set of code terminates. When the computer system invokes a set of code, such as by calling a method, it pushes a corresponding frame onto the call stack. The frame most recently pushed onto a call stack is referred to as the current frame, and is said to be located at the top of the call stack. When execution of a set of code terminates, such as when a method terminates, the current frame is popped from the call stack. Control passes to a different set of code that uses the next frame, i.e., the frame located below the popped frame in the call stack. The next frame becomes the current frame. The computer system maintains a stack pointer that tracks the memory location of the current frame.

In one example, a set of code invokes method A. The computer system pushes frame A onto the call stack, to be used by method A. In turn, method A invokes method B. The computer system pushes frame B onto the call stack, to be used by method B. When method B terminates, the computer system pops frame B from the call stack, so that frame A becomes the current frame. If method B returns a value, the computer system stores the return value in frame A. Control passes to the next instruction in method A, indicated by the return address in frame B. Method A continues to execute, using frame A, including any value(s) returned by method B.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 7 shows a block diagram that illustrates a computer system in accordance with one or more embodiments.

DETAILED DESCRIPTION

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
2.1 EXAMPLE CLASS FILE STRUCTURE
2.2 EXAMPLE VIRTUAL MACHINE ARCHITECTURE
2.3 LOADING, LINKING, AND INITIALIZING
3. LAZY COPYING OF RUNTIME-MANAGED STACK FRAMES
4. MISCELLANEOUS; EXTENSIONS
5. HARDWARE OVERVIEW
6. COMPUTER NETWORKS AND CLOUD NETWORKS

1. General Overview

One or more embodiments include techniques for lazy copying of runtime-managed stack frames. A runtime environment generates a runtime-managed stack including multiple frames. A topmost subset of frames includes data associated with particular instructions and a return address. A lower subset frames includes data associated with different instructions. The runtime environment stores a copy of the topmost subset of frames in an OS-managed stack, without copying the lower subset of frames. The particular instructions execute using the copy of the topmost subset of frames in the OS-managed stack. The runtime environment replaces, in the copy, the return address with a return barrier address. When execution of the instructions terminates, control passes to return barrier instructions, which store a copy of the lower subset of frames in the OS-managed stack and pass control to the different instructions. The different instructions execute using the copy of the lower subset of frames in the OS-managed stack.

One or more embodiments described in this Specification and/or recited in the claims may not be included in this General Overview section.

2. Architectural Overview

Figure 1:
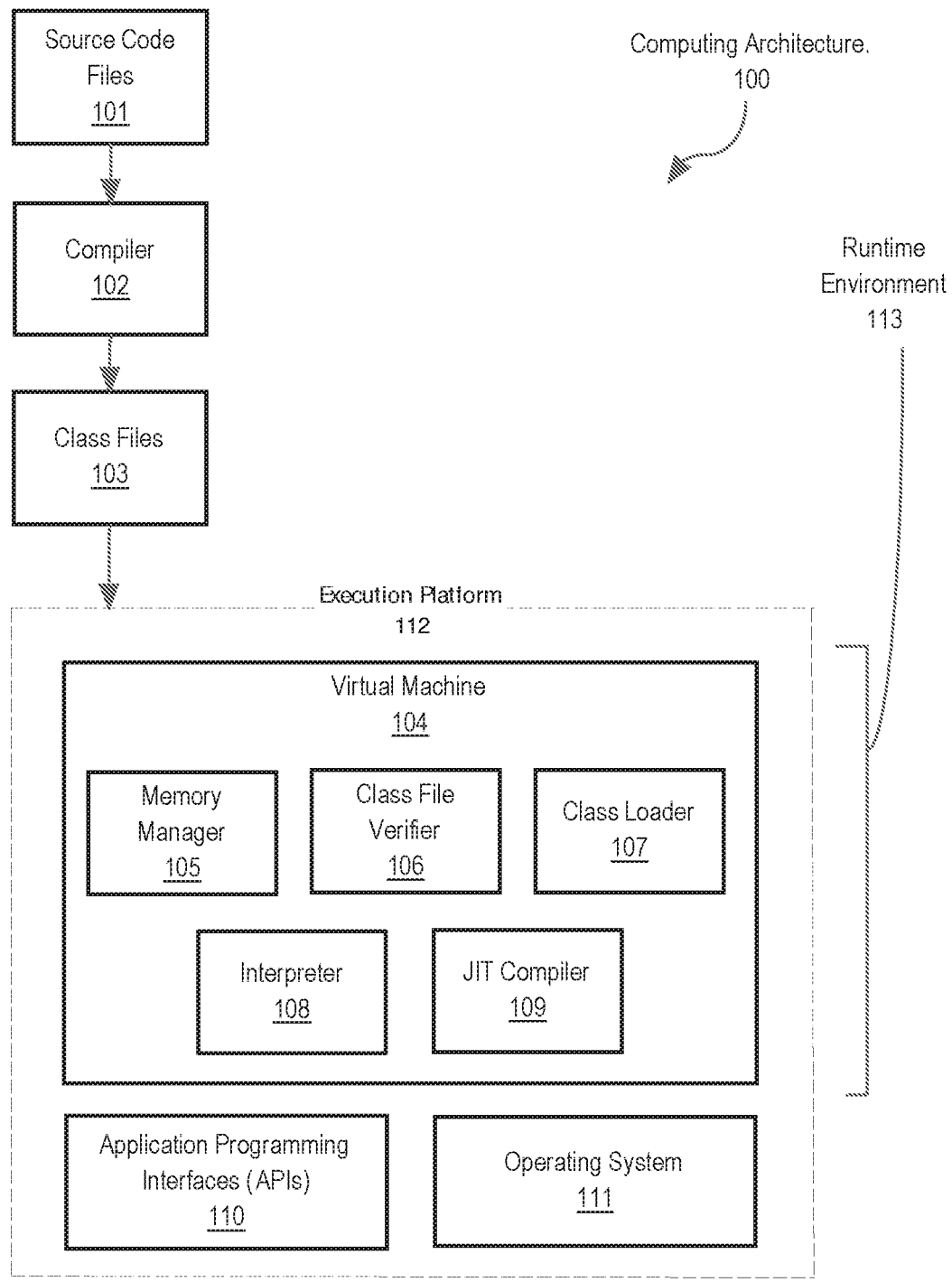
FIG. 1 illustrates an example computing architecture in which techniques described herein may be practiced.

FIG. 1 illustrates an example architecture in which techniques described herein may be practiced. Software and/or hardware components described with relation to the example architecture may be omitted or associated with a different set of functionality than described herein. Software and/or hardware components, not described herein, may be used within an environment in accordance with one or more embodiments. Accordingly, the example environment should not be constructed as limiting the scope of any of the claims.

As illustrated in FIG. 1, a computing architecture 100 includes source code files 101 which are compiled by a compiler 102 into class files 103 representing the program to be executed. The class files 103 are then loaded and executed by an execution platform 112, which includes a runtime environment 113, an operating system 111, and one or more application programming interfaces (APIs) 110 that enable communication between the runtime environment 113 and the operating system 111. The runtime environment 113 includes a virtual machine 104 comprising various components, such as a memory manager 105 (which may include a garbage collector), a class file verifier 106 to check the validity of class files 103, a class loader 107 to locate and build in-memory representations of classes, an interpreter 108 for executing the virtual machine 104 code, and a just-in-time (JIT) compiler 109 for producing optimized machine-level code.

In an embodiment, the computing architecture 100 includes source code files 101 that contain code that has been written in a particular programming language, such as Java, C, C++, C #, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the logical, human-readable, function-driven form used by the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code (i.e., without additional processing required to determine which data structures to use and which steps to use of those available to the virtual machine). Converting source code to virtual machine instructions includes mapping source code functionality from the language to virtual machine functionality that utilizes underlying resources, such as data structures. Often, functionality that is presented in a logical, human-readable, function-driven form via source code by the programmer is converted into more complex machine-centric steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code avoids this cost penalty at run-time to improve run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. In many dynamic languages (such as Java), the language is designed to allow code to be inserted during the program's execution such that compilation ahead-of-time can lead to inefficiencies. When a program is interpreted, the code of the program is read line-by-line and converted to machine-level instructions while the program is executing. As a result, the program has a shorter startup time (as compared with code that is loaded and compiled in full before execution begins, since it can begin executing without the delay of loading and compiling in full), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpasses a threshold (is "hot"), the virtual machine 104 invokes the JIT compiler 109 to perform an analysis of the block and generate optimized machine-level instructions which replaces the "hot" block of code for future executions. In some examples, programs spend a disproportionate amount of time executing a small portion of a larger body of executing code. For this reason, compiling just the "hot" portions of the program can provide similar performance to fully compiled code, but without the start-up penalty. Furthermore, although the optimization analysis is constrained to the "hot" block being replaced, there still exists far greater optimization potential than converting each instruction individually. There are a number of variations on the above described example, such as tiered compiling.

In one example, the source code files 101 have been illustrated as the "top level" representation of the program to be executed by the execution platform 112. Although the computing architecture 100 depicts the source code files 101 as a "top level" program representation, in other embodiments the source code files 101 may be an intermediate representation received via a "higher level" compiler that processed code files in a different language into the language of the source code files 101. Some examples in the following disclosure assume that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

In the following example, each of the class files 103 represents a respective "class" defined in the source code files 101 (or dynamically generated by the compiler 102/virtual machine 104). However, in other examples, the class file may represent multiple classes, depending on a variety of factors. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
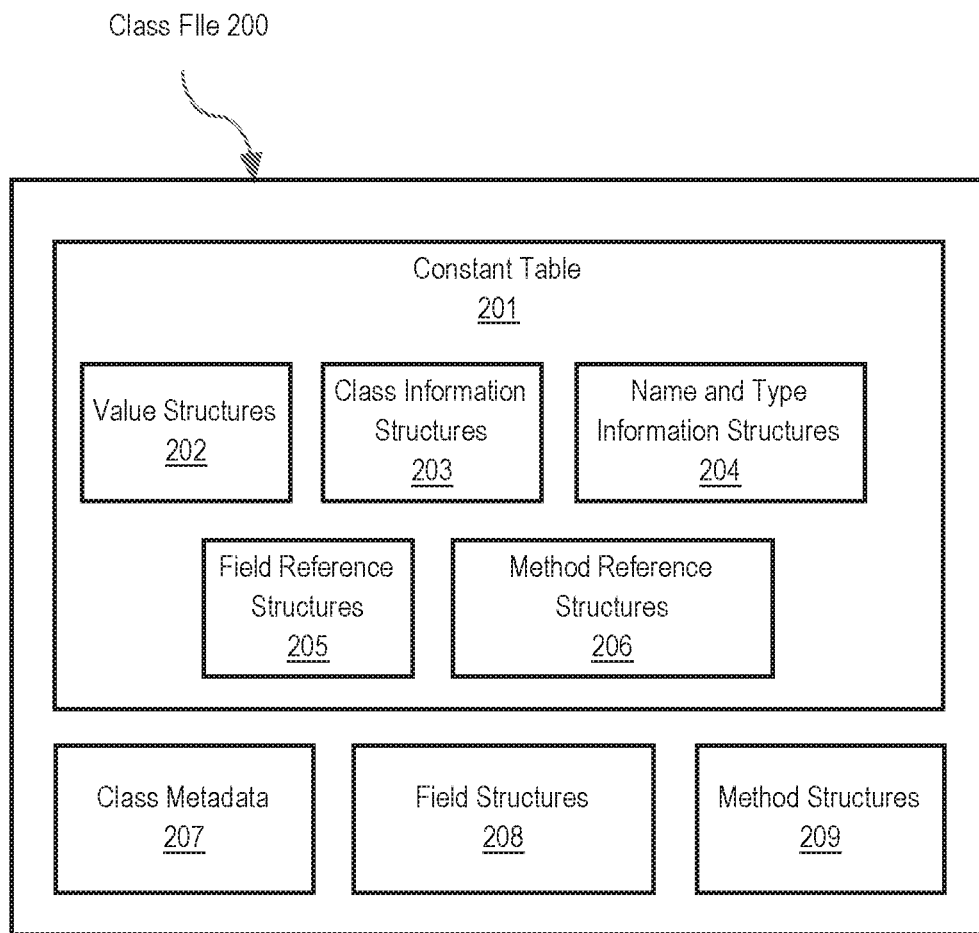
FIG. 2 is a block diagram illustrating an embodiment of a computer system suitable for implementing methods and features described herein.

FIG. 2 illustrates an example structure for a class file 200 in block diagram form according to an embodiment. In one example, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 207, and method structures 209. In an embodiment, the constant table 201 is a data structure which, among other functions, acts as a symbol table for the class. A symbol table is a data structure that stores information about each symbol (i.e., identifier) that appears in source code. In a class file 200, the constant table 201 stores information about identifiers that appear in the source code for that class. A linker may rely on entries in the constant table 201 to resolve the identifiers. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 204, field reference structures 205, and method reference structures 206 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 205 of the constant table 201 hold an index into the constant table 201 to one of the class information structures 203 representing the class defining the field and an index into the constant table 201 to one of the name and type information structures 204 that provides the name and descriptor of the field. Method reference structures 206 of the constant table 201 hold an index into the constant table 201 to one of the class information structures 203 representing the class defining the method and an index into the constant table 201 to one of the name and type information structures 204 that provides the name and descriptor for the method. The class information structures 203 hold an index into the constant table 201 to one of the value structures 202 holding the name of the associated class.

The name and type information structures 204 hold an index into the constant table 201 to one of the value structures 202 storing the name of the field/method and an index into the constant table 201 to one of the value structures 202 storing the descriptor.

In an embodiment, class metadata 207 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth. In object-oriented programming, a subclass is a class that extends another class, which is referred to as its superclass. A subclass inherits functionality of its superclass, such as fields, methods, interfaces, etc. In addition, a subclass may introduce additional functionality and/or override functionality inherited from a superclass. A system of superclasses and subclasses may be referred to as an inheritance hierarchy or "tree." A superclass may be referred to as a "parent" or "ancestor" class of a subclass, and a subclass may be referred to as a "child" or "descendent" class of a superclass.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the base name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201. Using Java as an example, accesses to constant values are shown in the following class:

```
class A
{
    int add12and13( ) {
        return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 supports a variety of runtime environments, regardless of how and where the classes will be stored once loaded into the runtime environment 113. As will be described in Section 2.3, eventually the run-time representations of the symbolic references are resolved into actual memory addresses by the virtual machine 104 after the referenced classes (and associated structures) have been loaded into the runtime environment and allocated concrete memory locations.

2.2 Example Virtual Machine Architecture

Figure 3:
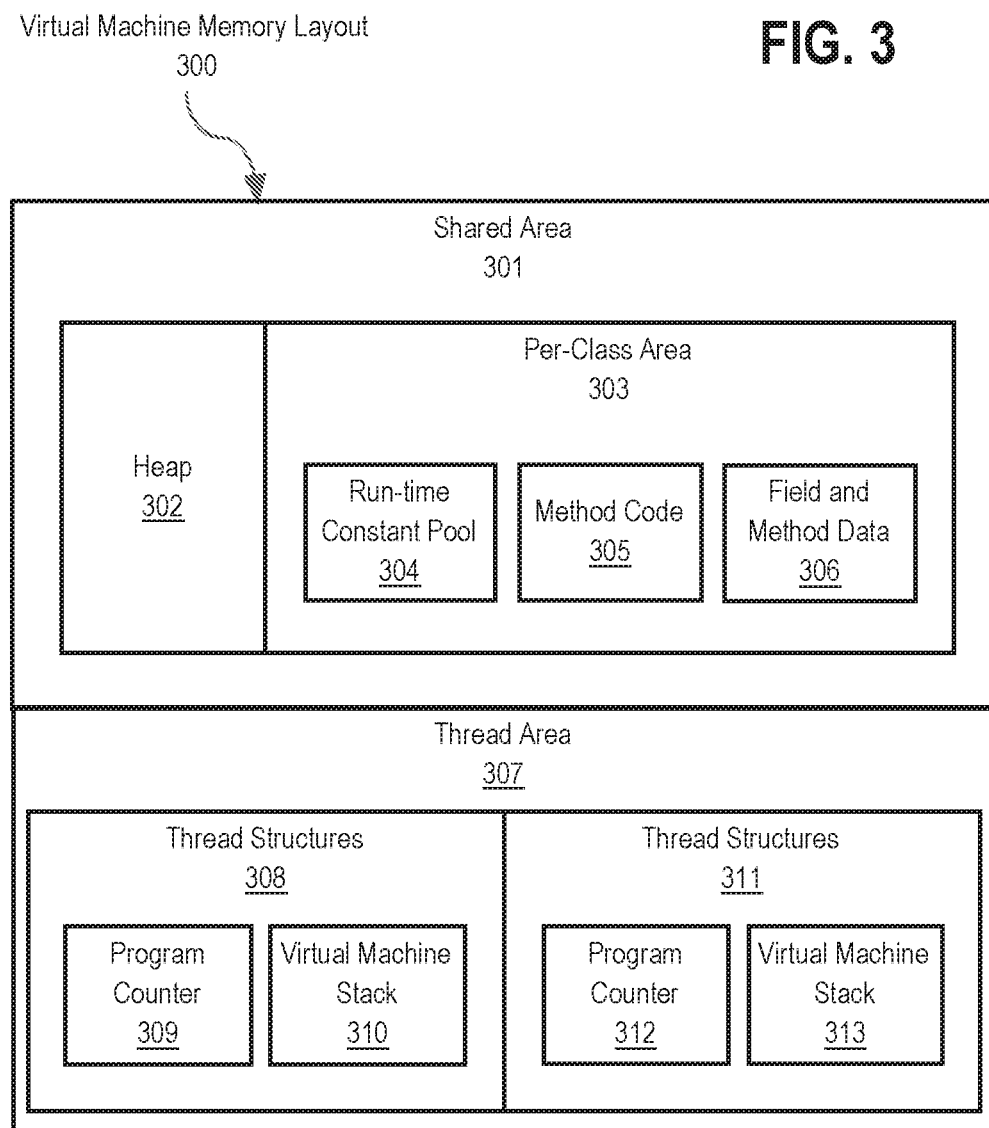
FIG. 3 illustrates an example virtual machine memory layout in block diagram form according to an embodiment.

FIG. 3 illustrates an example virtual machine memory layout 300 in block diagram form according to an embodiment. In one example, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307. The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In one example, the thread area 307 depicted in FIG. 3 assumes two threads are executing on the virtual machine 104. However, in a practical environment, the virtual machine 104 may execute any number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads.

Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread.

When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
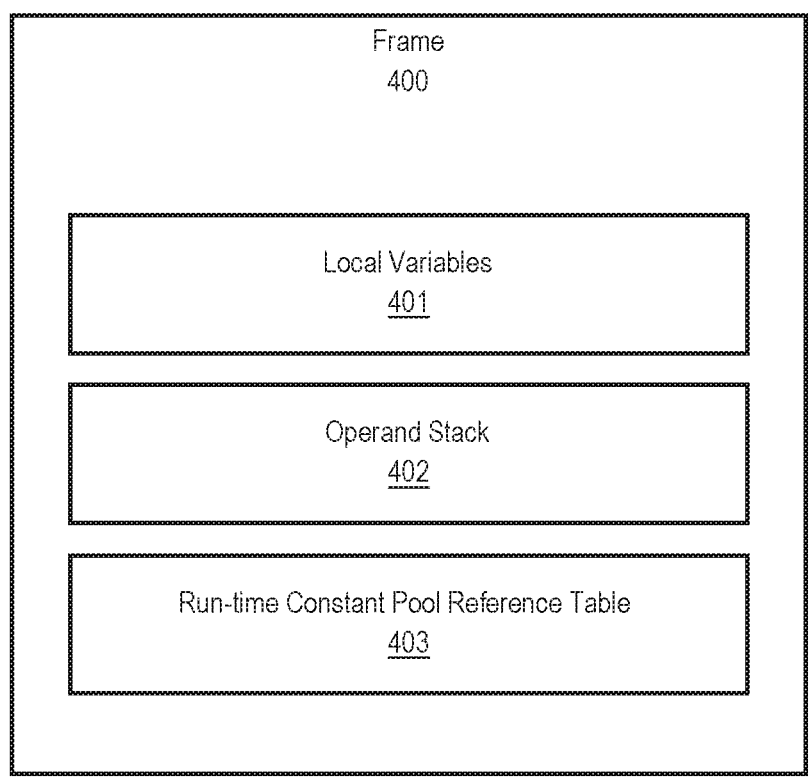
FIG. 4 illustrates an example frame in block diagram form according to an embodiment.

FIG. 4 illustrates an example frame 400 in block diagram form according to an embodiment. In the remaining examples, frames of virtual machine stack 310 and virtual machine stack 313 adhere to the structure of frame 400.

In an embodiment, frame 400 includes local variables 401, operand stack 402, and run-time constant pool reference table 403. In an embodiment, the local variables 401 are represented as an array of variables that each hold a value, for example, Boolean, byte, char, short, int, float, or reference. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses. For symbols that reference other classes, the resolution mechanism may load classes as necessary to resolve symbols that have not yet been defined or resolved. In addition, the resolution mechanism translates variable accesses into appropriate offsets into storage structures associated with the run-time locations of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the runtime environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily" or on an as-needed basis) one or more functions of the loading, linking, and initializing process until the class is actually required. For example, resolution of a method reference may be delayed until a virtual machine instruction invoking the method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super-classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class (i.e., the class currently under evaluation by the class verification mechanism, when such mechanism is in place and running, as it traverses through evaluation of different classes) has correct access permissions for classes/fields/structures referenced in the constant pool 304, check that the virtual machine 104 code of methods will not cause unexpected behavior based on an expressed form of preferences by the programmer, in code, as the code was initially written (e.g., making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then replaces the symbolic references with a reference to the concrete memory location of the referenced class, field, or method. In an embodiment, the virtual machine 104 caches resolutions to be reused in case the same class/name/descriptor is encountered when the virtual machine 104 processes another class. For example, in some cases, class A and class B may invoke the same method of class C. Thus, when resolution is performed for class A, that result can be cached and reused during resolution of the same symbolic reference in class B to reduce overhead.

In some embodiments, the step of resolving the symbolic references during linking is optional. For example, an embodiment may perform the symbolic resolution on an as-needed basis, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3. Lazy Coping of Runtime-Managed Stack Frames

In an embodiment, a runtime environment (for example, the JRE), running on top of an operating system (OS), generates and manages a call stack that is separate from any call stack managed by OS. The call stack that the runtime environment manages is referred to herein as a runtime-managed stack, in contrast to an OS-managed stack. The runtime environment may use a runtime-managed stack for many different reasons. In one example, the runtime environment uses a runtime-managed stack to support runtime-managed multithreading, where individual threads are scheduled and managed by the runtime environment rather than the OS. The runtime-managed threads may be referred to as fibers or user-mode threads, in contrast to OS-managed threads that are scheduled and managed by the OS kernel. The runtime environment may be able to schedule and manage considerably more threads than the OS natively supports, thus allowing for greater utilization of the computer system's available processing cycles. Other examples include continuations and generators. A continuation is a set of code that stores a program's current execution state, allowing execution to be suspended and later resumed. A generator is a set of code that computes and returns the next value in a sequence on an as-needed basis. Each time the generator is called, it resumes where it left off. In general, a runtime-managed stack may allow the runtime environment to implement more features and/or use system resources more efficiently than would be possible if relying on the OS to manage the call stack.

In an embodiment, although the runtime environment generates and manages the runtime-managed stack, it is necessary and/or preferable for instructions to use frames located in an OS-managed stack. In one example, the OS does not support pointing a stack pointer at a runtime-managed stack that is separate from an OS-managed stack. An ARM processor requires any call stack to be located in a specific region of memory and does not allow the stack pointer to reference a runtime-managed stack outside that region of memory. In another example, the runtime environment represents frames in the runtime-managed stack in a manner that is different from how the OS represents frames in an OS-managed stack.

In some embodiments, the runtime environment pushes frames from the runtime-managed stack onto an OS-managed stack for use during program execution. Copying the entire runtime-managed stack to the OS-managed stack would incur a computing cost that is linearly proportional to the size (i.e., depth as measured in frames) of the runtime-managed stack. The work to be performed in the execution session may not require all the frames from the runtime-managed stack. To avoid incurring this computing cost and/or to spread out the computing cost over multiple operations, rather than incurring the full cost up front, the runtime environment may copy subsets of one or more frames to the OS-managed stack only as needed. Copying one or more frames on an as-needed basis, rather than copying all the frames at once, may be referred to as "lazy" copying.

Figure 5:
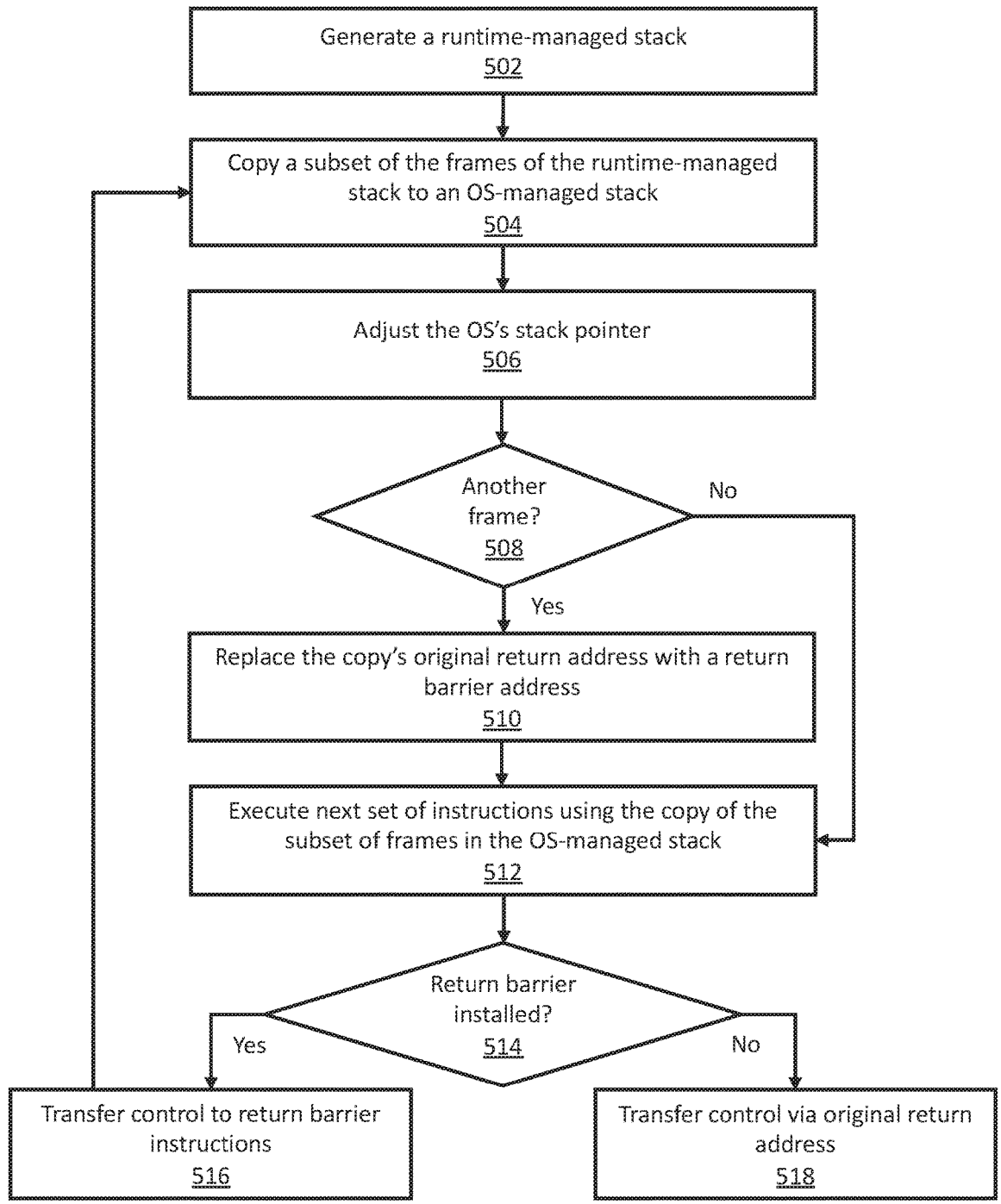
FIG. 5 illustrates a set of operations for lazy copying of runtime-managed stack frames in accordance with one or more embodiments.

FIG. 5 illustrates an example set of operations for lazy copying of runtime-managed stack frames in accordance with one or more embodiments. One or more operations illustrated in FIG. 5 may be modified, rearranged, or omitted all together. Accordingly, the particular sequence of operations illustrated in FIG. 5 should not be construed as limiting the scope of one or more embodiments.

In an embodiment, the runtime environment generates a runtime-managed stack (Operation 502). The runtime-managed stack is separate from any call stack that is managed by the OS. The decision to execute a set of code using a runtime-managed stack, rather than using an OS-managed stack directly, may be at a programmer's discretion. To use a runtime-managed stack, the programmer may invoke a particular API of the runtime environment that is known to use a runtime-managed stack. When a set of code is executing using a runtime-managed stack, the runtime-managed stack is "mounted." When the set of code terminates or suspends (for example, when a generator yields a generated value or a fiber blocks), the runtime-managed stack is "unmounted" or "dismounted." The time from when the runtime-managed stack is mounted to when it is dismounted may be thought of as a single execution session. As noted above, although the runtime environment generates and manages the runtime-managed stack, it may be necessary and/or preferable for instructions to use frames located in an OS-managed stack.

In an embodiment, rather than copy the entire runtime-managed stack to the OS-managed stack, the runtime environment copies a subset of the frames of the runtime managed stack to the OS-managed stack (Operation 504). A subset of frames may include only one frame or multiple frames. The runtime environment may initially copy a subset of multiple frames (e.g., two frames) and, for a subsequent copying operation as described in further detail below, copy a subset of only one additional frame. The number of frames to include in a subset to be copied may vary depending on the kind of instructions being executed (e.g., multithreading instructions versus another kind of instructions), the operating system on which the runtime environment is running, performance considerations such as a current CPU load, a user-specified configuration, or any other factor or combination thereof. The number of frames to include in a subset may be adaptive, i.e., change over time depending on one or more factors. If the runtime environment represents frames in the runtime-managed stack in a manner that is different from how the OS represents frames in the OS-managed stack, the runtime environment may modify the subset of frames as needed for compatibility when copying to the OS-managed stack. In an embodiment, after copying the subset of frames to the OS-managed stack, the runtime environment adjusts the OS's stack pointer (Operation 506) to point to the newly copied frame on the OS-managed stack.

In an embodiment, the runtime environment installs a return barrier, as described below, to ensure that additional subsets of frames are copied to the OS-managed stack as needed. The return barrier is not needed if there are no more frames on the runtime-managed stack. The runtime environment determines whether there is another frame on the runtime-managed stack (Operation 508). If there is another frame on the runtime-managed stack, then in the subset of frames copied to the OS-managed stack, the runtime environment replaces the original return address with a return barrier address (Operation 510). If the subset of frames copied to the OS-managed stack includes multiple frames, then the runtime environment replaces the return address in the bottommost frame of the subset. The return barrier address corresponds to a location, in memory, of instructions (referred to herein as a return barrier or return barrier instructions) used to copy additional subsets of frames from the runtime-managed stack to the OS-managed stack as needed. The operation of replacing the original return address with the return barrier address may be referred to as installing the return barrier. The runtime environment may replace the return address before writing the subset of frames to the OS-managed stack or after writing the subset of frames to the OS-managed stack. In an embodiment, when the runtime barrier is installed, the runtime environment stores a copy of the original return address. The runtime environment may store the original return address in metadata associated with the runtime-managed stack.

In an embodiment, after installing the runtime barrier, or if no runtime barrier was needed, the runtime environment executes the next set of instructions using the copy of the subset of frames, i.e., the frame(s) located on the OS-managed stack (Operation 512). When the set of instructions terminates, control passes to the return address located in the frame used by the set of instructions. Determining whether the return barrier is installed (Operation 514) may not involve any operation that returns a true or false value. In an embodiment, the runtime environment simply reads the return address from the frame and passes control to the set of instructions referenced by that return address. If the return barrier was not installed, then control passes to the set of instructions referenced by the frame's original return address (Operation 518).

In an embodiment, if the return barrier was installed, then control passes to the return barrier instructions (Operation 516). The return barrier proceeds to copy the next subset of frames of the runtime-managed stack to the OS-managed stack (Operation 504). In addition, the return barrier may preserve any result (i.e., return value) supplied by the set of instructions from which control passed to the return barrier. The return barrier may install that result into the next subset of frames copied to the OS-managed stack. In some embodiments, the runtime environment copies frames to a single OS-managed stack during a given execution session. A particular set of operations (for example, a fiber, continuation, or generator) may execute over multiple execution sessions. Over multiple execution sessions, the runtime environment may mount the runtime-managed stack to two or more different OS threads, with corresponding different OS-managed stacks. A particular set of operations may not be bound to a single OS-managed stack.

In an embodiment, the return barrier adjusts the OS's stack pointer (Operation 506) to point to the newly copied subset of frames. If there is another frame in the runtime-managed stack (Operation 508), then the return barrier installs itself in the bottommost frame just copied (Operation 510), retaining a copy of the original return address of that frame. Whether or not the return barrier installs itself in the newly copied subset of frames, the return barrier retrieves the original return address of the current frame, which was stored when the return barrier was installed. The original return address corresponds to the location of instructions that use the most recently copied subset of frames. The return barrier passes control to the set of instructions referenced by the original return address, which proceed to execute using the newly copied subset of frames on the OS-managed stack (Operation 512). When those instructions terminate, then control either passes again to the return barrier instructions (Operation 516) or to the set of instructions referenced by the original return address (Operation 518). This process repeats until there are no more frames on the runtime-managed stack or processing otherwise terminates.

In an embodiment, a set of instructions may terminate normally (i.e., without an error) or exceptionally (i.e., with an error, such as when Java code throws an exception). If a set of instructions terminates exceptionally and control passes to the return barrier, the return barrier may not pass control to the original return address. Instead, the return barrier may pass control to a different set of code that is designed to handle runtime errors. To determine where to transfer control, the return barrier may perform a lookup, in metadata maintained by the runtime environment, to determine the address of the appropriate error handler. The lookup may be based, in part, on the original return address.

4. Illustrative Example

FIGS. 6A-6D illustrate an example in block diagram form according to an embodiment. The example in FIGS. 6A-6D is provided for illustrative purposes only and should not be construed as limiting one or more embodiments.

Figure 6A:
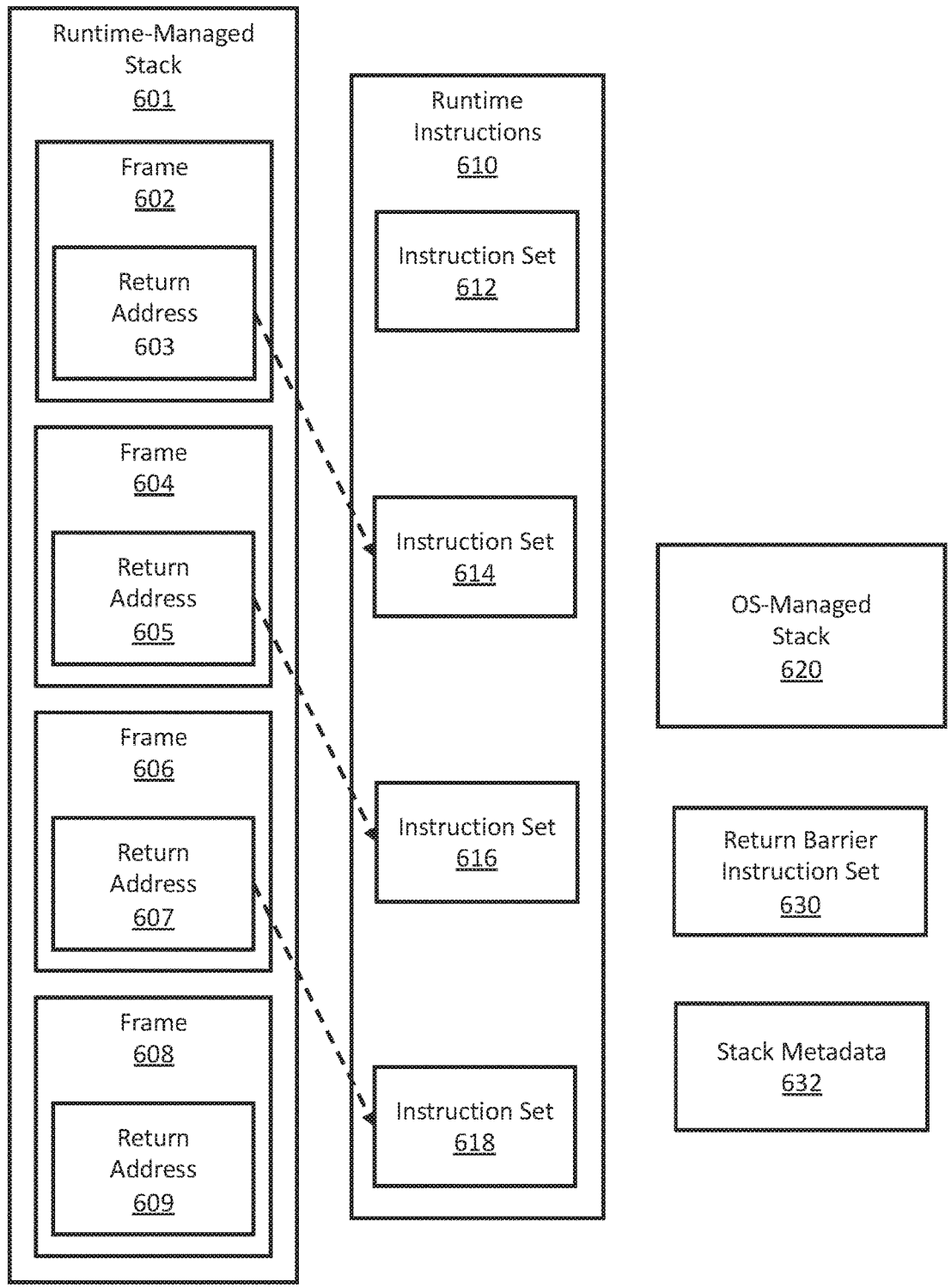
FIGS. 6A-6D illustrate an example in block diagram form according to an embodiment.

As illustrated in FIG. 6A, a system 600 includes a runtime-managed stack 601, generated by a runtime environment. The runtime-managed stack 601 includes four frames 602, 604, 606, 608, each with a corresponding return address 603, 605, 607, 609. Frame 602 is the top frame in the runtime-managed stack 601.

In this example, the system 600 further includes runtime instructions 610, which includes multiple instruction sets 612, 614, 616, 618. Each instruction set includes one or more instructions that are configured to use a corresponding frame. Instruction set 612 is configured to use frame 602 (or a copy thereof in the OS-managed stack 620), which includes a return address 603 that references instruction set 614. Instruction set 614 is configured to use frame 604 (or a copy thereof in the OS-managed stack 620), which includes a return address 605 that references instruction set 616. Instruction set 616 is configured to use frame 606 (or a copy thereof in the OS-managed stack 620), which includes a return address 607 that references instruction set 618. Instruction set 618 is configured to use frame 608 (or a copy thereof in the OS-managed stack 620), which includes a return address 609 that references a corresponding instruction set (not shown).

In this example, the system 600 further includes an OS-managed stack 620. As illustrated in FIG. 6A, the OS-managed stack 620 is initially empty. Alternatively, the OS-managed stack 620 may already include one or more frames (not shown). Frames from the runtime-managed stack 601 may be copied and pushed onto the OS-managed stack 620 'above' one or more frames that are already in the OS-managed stack 620.

In this example, the system 600 further includes a return barrier instruction set 630. The return barrier instruction set 630 includes one or more instructions used to lazily copy runtime-managed stack frames, as described herein. In addition, the system 600 includes stack metadata 632 managed by the runtime environment. The stack metadata 632 includes metadata associated with the runtime-managed stack 601. Specifically, in this example, the return barrier instruction set 630 stores original return addresses in the stack metadata 632, as described below.

Figure 6B:
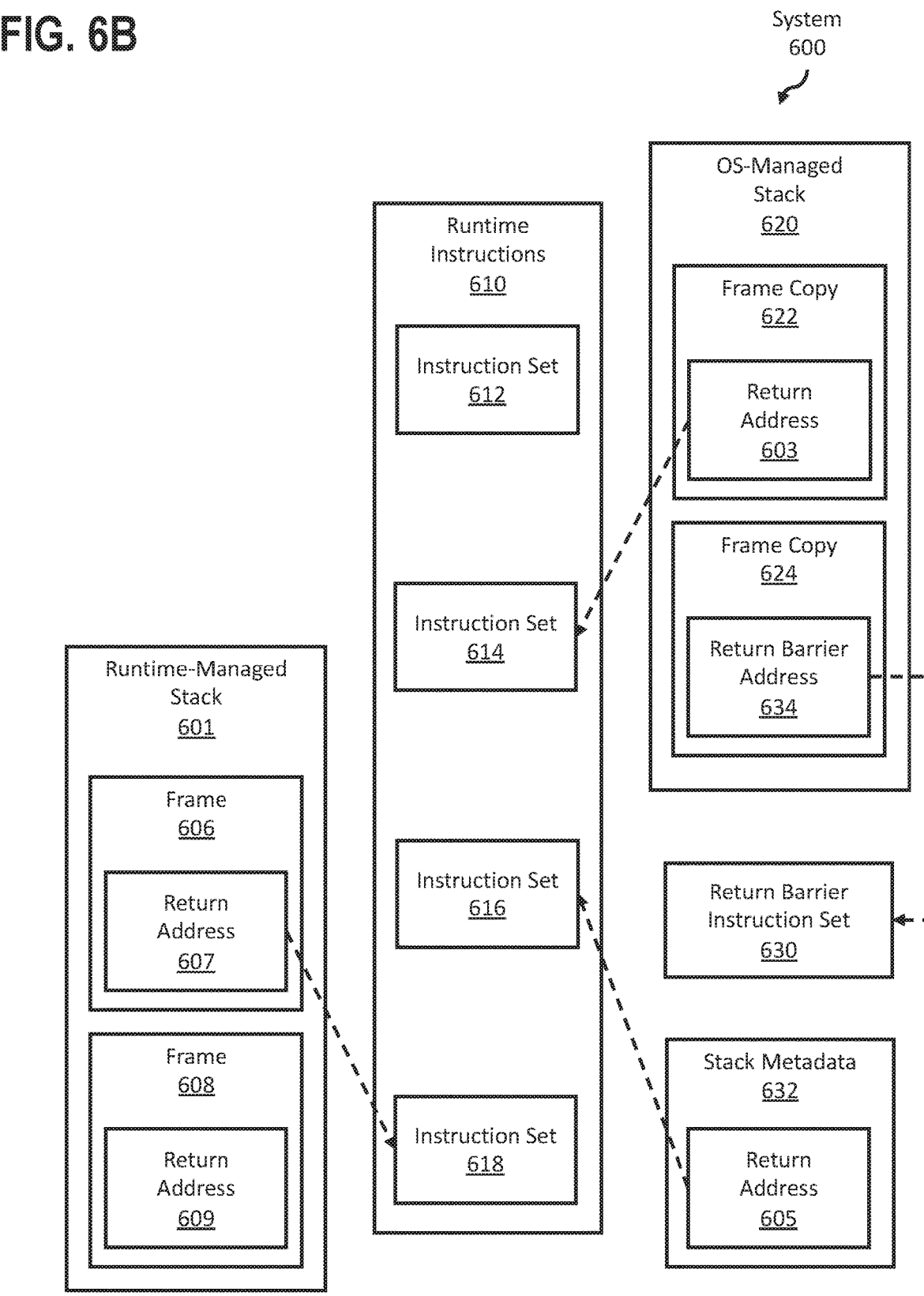

In FIG. 6B, the runtime environment has initially copied the top two frames 602, 604 from the runtime-managed stack 601 onto the OS-managed stack 620, as frame copy 622 and frame copy 624, respectively. In this example, the runtime environment has removed the original frames 602, 604 from the runtime-managed stack 601. Alternatively, the runtime environment may retain copies of the original frames 602, 604 in the runtime-managed stack 601 and/or elsewhere. Because the runtime environment has copied two frames to the OS-managed stack 620, the top frame copy 622 still includes its original return address 603, referencing instruction set 614. However, the runtime environment has replaced the original return address 605 in the bottommost frame copied, i.e., frame copy 624, with a return barrier address 634 that references the return barrier instruction set 630. In addition, the runtime environment has stored the original return address 605 of frame 604 in the stack metadata 632.

As configured in FIG. 6B, instruction set 612 will execute using frame copy 622. Upon termination of instruction set 612, the runtime environment will follow the original return address 603 to instruction set 614 and pop frame copy 622 from the OS-managed stack 620. Instruction set 614 will execute using frame copy 624. Upon termination of instruction set 614, the runtime environment will follow the return barrier address 634 to the return barrier instruction set 630. The return barrier instruction set 630 will lazily copy the next frame 606 from the runtime-managed stack 601 to the OS-managed stack 620, as illustrated in FIG. 6C, and then follow the original return address 605 to instruction set 616.

Figure 6C:
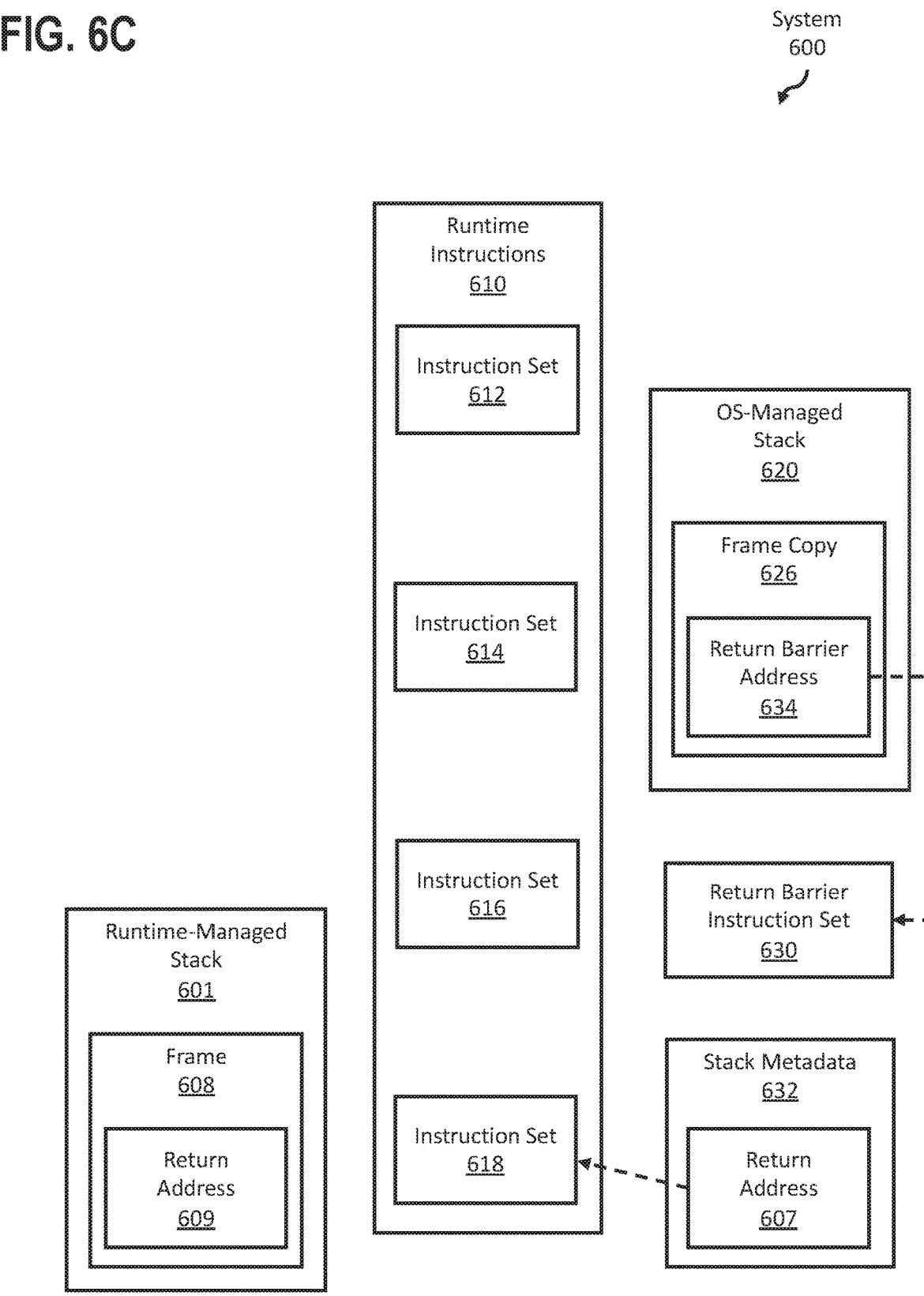

In FIG. 6C, the return barrier instruction set 630 has copied the top frame 606 from the runtime-managed stack 601 onto the OS-managed stack 620, as frame copy 626. In this example, the runtime environment has removed the original frame 606 from the runtime-managed stack 601. Alternatively, the runtime environment may retain a copy of the original frame 606 in the runtime-managed stack 601 and/or elsewhere. Because the runtime-managed stack 601 still includes another frame 608, the return barrier instruction set 630 has replaced the original return address 607 in the single frame copied, i.e., frame copy 626, with the return barrier address 634 that references the return barrier instruction set 630. In addition, the return barrier instruction set 630 has stored the original return address 607 of frame 607 in the stack metadata 632.

As configured in FIG. 6C, instruction set 616 will execute using frame copy 626. Upon termination of instruction set 616, the runtime environment will follow the return barrier address 634 to the return barrier instruction set 630. The return barrier instruction set 630 will lazily copy the next frame 608 from the runtime-managed stack 601 to the OS-managed stack 620, as illustrated in FIG. 6D, and then follow the original return address 607 to instruction set 618.

Figure 6D:
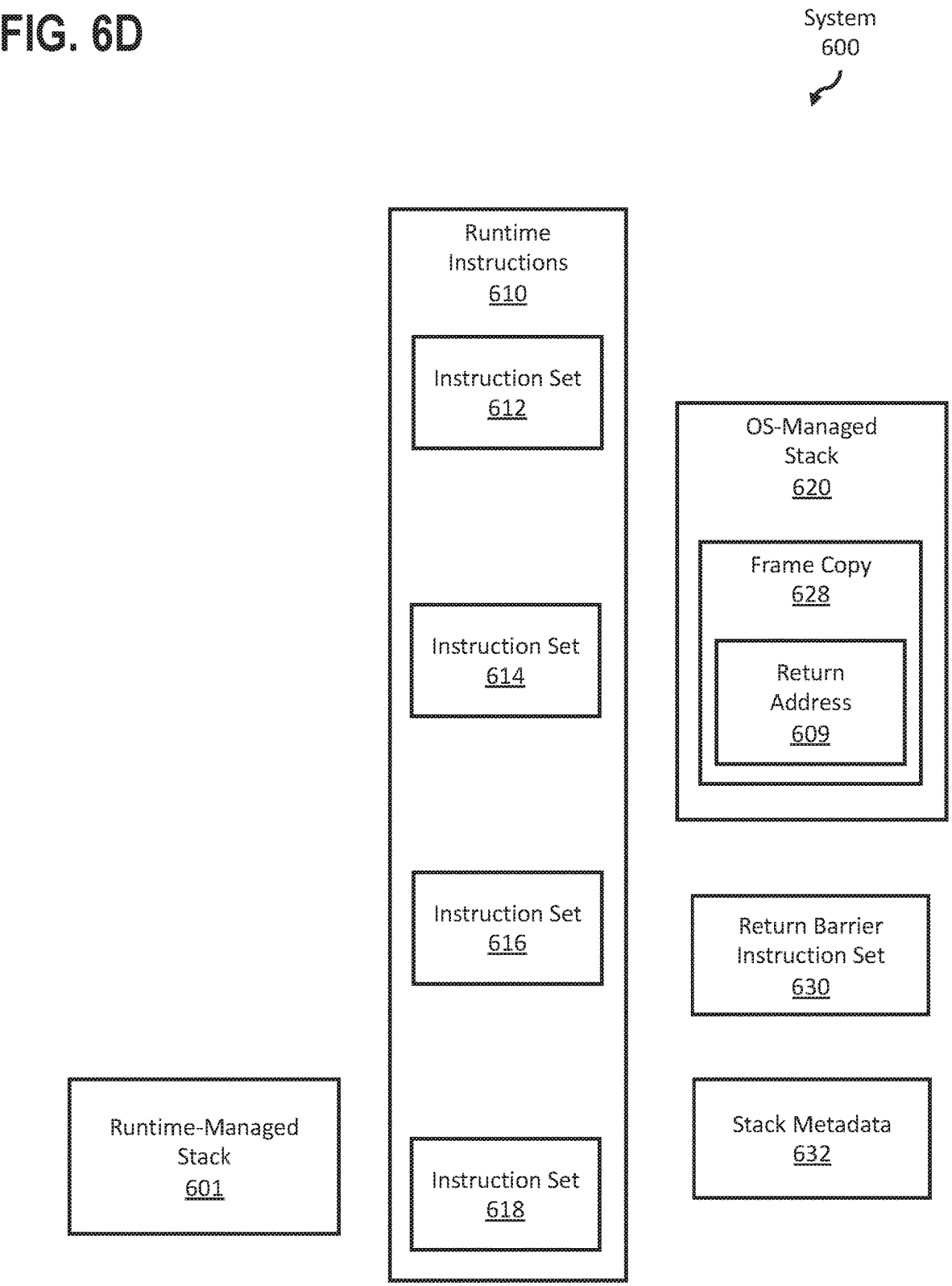

In FIG. 6D, the return barrier instruction set 630 has copied the top frame 608 from the runtime-managed stack 601 onto the OS-managed stack 620, as frame copy 628. In this example, the runtime environment has removed the original frame 608 from the runtime-managed stack 601. Alternatively, the runtime environment may retain a copy of the original frame 608 in the runtime-managed stack 601 and/or elsewhere. Because there are no more frames remaining in the runtime-managed stack 601, the top frame copy 628 still includes its original return address 609, referencing the corresponding instruction set (not shown). The return barrier instruction set 630 is not needed in this configuration and it is not necessary to store the original return address 609 in the stack metadata 632. As configured in FIG. 6C, instruction set 618 will execute using frame copy 628. Upon termination of instruction set 618, the runtime environment will follow the original return address 609 to the corresponding instruction. At this point, every frame in the runtime-managed stack 601 has been used, having been lazily copied to the OS-managed stack 620 on an as-needed basis using the return barrier instruction set 630.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or in addition, the computer system 700 may receive user input via a cursor control 716, such as a mouse, a trackball, a trackpad, a touchscreen, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. The display 712 may be configured to receive user input via one or more pressure-sensitive sensors, multi-touch sensors, and/or gesture sensors. Alternatively or in addition, the computer system 700 may receive user input via a microphone, video camera, and/or some other kind of user input device (not shown).

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 700 can receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause performance of operations comprising:

generating, by a runtime environment executing on top of an operating system (OS), a runtime-managed stack comprising a plurality of frames, wherein a first subset of the plurality of frames is topmost in the runtime-managed stack and comprises data associated with a first plurality of instructions, wherein a second subset of the plurality of frames is located below the first subset of the plurality of frames in the runtime-managed stack and comprises data associated with a second plurality of instructions, and wherein the first subset of the plurality of frames comprises a first return address associated with the second plurality of instructions;

storing a copy of the first subset of the plurality of frames in the OS-managed stack, without copying the second subset of the plurality of frames to the OS-managed stack, wherein the first plurality of instructions executes using the copy of the first subset of the plurality of frames in the OS-managed stack;

replacing, in the copy of the first subset of the plurality of frames, the first return address with a return barrier address associated with return barrier instructions, such that when execution of the first plurality of instructions terminates, control passes to the return barrier instructions;

storing, by the return barrier instructions after execution of the first plurality of instructions terminates, a copy of the second subset of the plurality of frames in the OS-managed stack; and after storing the copy of the second subset of the plurality of frames in the OS-managed stack: passing control from the return barrier instructions to the second plurality of instructions, wherein the second plurality of instructions executes using the copy of the second subset of the plurality of frames in the OS-managed stack.

2. The medium of claim 1, the operations further comprising:

determining, by the return barrier instructions, that the runtime-managed stack comprises a third subset of the plurality of frames, wherein the third subset of the plurality of frames is located below the second subset of the plurality of frames in the runtime-managed stack and comprises data associated with a third plurality of instructions, and wherein the second subset of the plurality of frames comprises a second return address associated with the third plurality of instructions;

replacing, in the copy of the second subset of the plurality of frames, the second return address with the return barrier address, such that when execution of the second plurality of instructions terminates, control passes to the return barrier instructions;

storing, by the return barrier instructions after execution of the second plurality of instructions terminates, a copy of the third subset of the plurality of frames in the OS-managed stack; and after storing the copy of the third subset of the plurality of frames in the OS-managed stack:

passing control from the return barrier instructions to the third plurality of instructions, wherein the third plurality of instructions executes using the copy of the third subset of the plurality of frames in the OS-managed stack.

3. The medium of claim 1, the operations further comprising:

after storing the copy of the first subset of the plurality of frames in the OS-managed stack, pointing a native stack pointer of the OS at the copy of the first subset of the plurality of frames in the OS-managed stack; and after storing the copy of the second subset of the plurality of frames in the OS-managed stack, pointing the native stack pointer at the copy of the second subset of the plurality of frames in the OS-managed stack.

4. The medium of claim 1, the operations further comprising:

before replacing the first return address with the return barrier address: storing a copy of the first return address, wherein passing control from the return barrier instructions to the second plurality of instructions comprises retrieving the copy of the first return address.

5. The medium of claim 1, wherein replacing the first return address with the return barrier address is performed in the OS-managed stack after storing the copy of the first subset of the plurality of frames in the OS-managed stack.

6. The medium of claim 1, wherein the runtime environment is a virtual machine, and wherein the first plurality of instructions and the second plurality of instructions comprise bytecode instructions executable by the virtual machine.

7. The medium of claim 1, wherein the first subset of the plurality of frames comprises only one frame.

8. A system comprising:

at least one device including a hardware processor;

the system being configured to perform operations comprising:

generating, by a runtime environment executing on top of an operating system (OS), a runtime-managed stack comprising a plurality of frames, wherein a first subset of the plurality of frames is topmost in the runtime-managed stack and comprises data associated with a first plurality of instructions, wherein a second subset of the plurality of frames is located below the first subset of the plurality of frames in the runtime-managed stack and comprises data associated with a second plurality of instructions, and wherein the first subset of the plurality of frames comprises a first return address associated with the second plurality of instructions;

storing a copy of the first subset of the plurality of frames in the OS-managed stack, without copying the second subset of the plurality of frames to the OS-managed stack, wherein the first plurality of instructions executes using the copy of the first subset of the plurality of frames in the OS-managed stack;

replacing, in the copy of the first subset of the plurality of frames, the first return address with a return barrier address associated with return barrier instructions, such that when execution of the first plurality of instructions terminates, control passes to the return barrier instructions;

storing, by the return barrier instructions after execution of the first plurality of instructions terminates, a copy of the second subset of the plurality of frames in the OS-managed stack; and after storing the copy of the second subset of the plurality of frames in the OS-managed stack:

passing control from the return barrier instructions to the second plurality of instructions, wherein the second plurality of instructions executes using the copy of the second subset of the plurality of frames in the OS-managed stack.

9. The system of claim 8, the operations further comprising:
   determining, by the return barrier instructions, that the runtime-managed stack comprises a third subset of the plurality of frames,
      wherein the third subset of the plurality of frames is located below the second subset of the plurality of frames in the runtime-managed stack and comprises data associated with a third plurality of instructions, and
      wherein the second subset of the plurality of frames comprises a second return address associated with the third plurality of instructions;
   replacing, in the copy of the second subset of the plurality of frames, the second return address with the return barrier address, such that when execution of the second plurality of instructions terminates, control passes to the return barrier instructions;
   storing, by the return barrier instructions after execution of the second plurality of instructions terminates, a copy of the third subset of the plurality of frames in the OS-managed stack; and
   after storing the copy of the third subset of the plurality of frames in the OS-managed stack:
      passing control from the return barrier instructions to the third plurality of instructions, wherein the third plurality of instructions executes using the copy of the third subset of the plurality of frames in the OS-managed stack.

10. The system of claim 8, the operations further comprising:
   after storing the copy of the first subset of the plurality of frames in the OS-managed stack, pointing a native stack pointer of the OS at the copy of the first subset of the plurality of frames in the OS-managed stack; and
   after storing the copy of the second subset of the plurality of frames in the OS-managed stack, pointing the native stack pointer at the copy of the second subset of the plurality of frames in the OS-managed stack.

11. The system of claim 8, the operations further comprising:
   before replacing the first return address with the return barrier address: storing a copy of the first return address,
   wherein passing control from the return barrier instructions to the second plurality of instructions comprises retrieving the copy of the first return address.

12. The system of claim 8, wherein replacing the first return address with the return barrier address is performed in the OS-managed stack after storing the copy of the first subset of the plurality of frames in the OS-managed stack.

13. The system of claim 8, wherein the runtime environment is a virtual machine, and wherein the first plurality of instructions and the second plurality of instructions comprise bytecode instructions executable by the virtual machine.

14. The system of claim 8, wherein the first subset of the plurality of frames comprises only one frame.

15. A method comprising:
   generating, by a runtime environment executing on top of an operating system (OS), a runtime-managed stack comprising a plurality of frames,
      wherein a first subset of the plurality of frames is topmost in the runtime-managed stack and comprises data associated with a first plurality of instructions,
      wherein a second subset of the plurality of frames is located below the first subset of the plurality of frames in the runtime-managed stack and comprises data associated with a second plurality of instructions, and
      wherein the first subset of the plurality of frames comprises a first return address associated with the second plurality of instructions;
   storing a copy of the first subset of the plurality of frames in the OS-managed stack, without copying the second subset of the plurality of frames to the OS-managed stack, wherein the first plurality of instructions executes using the copy of the first subset of the plurality of frames in the OS-managed stack;
   replacing, in the copy of the first subset of the plurality of frames, the first return address with a return barrier address associated with return barrier instructions, such that when execution of the first plurality of instructions terminates, control passes to the return barrier instructions;
   storing, by the return barrier instructions after execution of the first plurality of instructions terminates, a copy of the second subset of the plurality of frames in the OS-managed stack; and
   after storing the copy of the second subset of the plurality of frames in the OS-managed stack:
      passing control from the return barrier instructions to the second plurality of instructions, wherein the second plurality of instructions executes using the copy of the second subset of the plurality of frames in the OS-managed stack,
   wherein the method is performed by at least one device comprising a hardware processor.

16. The method of claim 15, further comprising:
determining, by the return barrier instructions, that the runtime-managed stack comprises a third subset of the plurality of frames,
   wherein the third subset of the plurality of frames is located below the second subset of the plurality of frames in the runtime-managed stack and comprises data associated with a third plurality of instructions, and
   wherein the second subset of the plurality of frames comprises a second return address associated with the third plurality of instructions;
replacing, in the copy of the second subset of the plurality of frames, the second return address with the return barrier address, such that when execution of the second plurality of instructions terminates, control passes to the return barrier instructions;
storing, by the return barrier instructions after execution of the second plurality of instructions terminates, a copy of the third subset of the plurality of frames in the OS-managed stack; and
after storing the copy of the third subset of the plurality of frames in the OS-managed stack:
   passing control from the return barrier instructions to the third plurality of instructions, wherein the third plurality of instructions executes using the copy of the third subset of the plurality of frames in the OS-managed stack.

17. The method of claim 15, further comprising:
after storing the copy of the first subset of the plurality of frames in the OS-managed stack, pointing a native stack pointer of the OS at the copy of the first subset of the plurality of frames in the OS-managed stack; and after storing the copy of the second subset of the plurality of frames in the OS-managed stack, pointing the native stack pointer at the copy of the second subset of the plurality of frames in the OS-managed stack.

18. The method of claim 15, further comprising:
before replacing the first return address with the return barrier address: storing a copy of the first return address,
wherein passing control from the return barrier instructions to the second plurality of instructions comprises retrieving the copy of the first return address.

19. The method of claim 15, wherein replacing the first return address with the return barrier address is performed in the OS-managed stack after storing the copy of the first subset of the plurality of frames in the OS-managed stack.

20. The method of claim 15, wherein the runtime environment is a virtual machine, and wherein the first plurality of instructions and the second plurality of instructions comprise bytecode instructions executable by the virtual machine.

* * * * *